(12) United States Patent
Hsu et al.

(10) Patent No.: US 8,054,408 B2
(45) Date of Patent: Nov. 8, 2011

(54) LIQUID CRYSTAL DISPLAY

(75) Inventors: Ya-Ling Hsu, Hsin-Chu (TW);
Chun-Liang Lin, Hsin-Chu (TW);
Chien-Kai Chen, Hsin-Chu (TW);
Chen-Hsien Liao, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 207 days.

(21) Appl. No.: 12/367,547

(22) Filed: Feb. 8, 2009

(65) Prior Publication Data
US 2010/0141871 A1 Jun. 10, 2010

(30) Foreign Application Priority Data
Dec. 9, 2008 (TW) ................................ 97147788 A

(51) Int. Cl.
*G02F 1/1335* (2006.01)

(52) U.S. Cl. ................................ 349/68; 349/69; 349/70

(58) Field of Classification Search ............... 349/61–71
See application file for complete search history.

(56) References Cited

U.S. PATENT DOCUMENTS

| 7,755,716 B2 * | 7/2010 | Wang et al. ............ 349/65 |
| 2004/0114342 A1 | 6/2004 | Lin et al. |
| 2006/0215388 A1 | 9/2006 | Hamada |
| 2006/0227260 A1 | 10/2006 | Haga et al. |
| 2010/0066945 A1 * | 3/2010 | Kamada ............ 349/64 |

FOREIGN PATENT DOCUMENTS

| CN | 1837924 A | 9/2006 |
| CN | 101038397 A | 9/2007 |

* cited by examiner

*Primary Examiner* — Dung T. Nguyen
(74) *Attorney, Agent, or Firm* — Winston Hsu; Scott Margo

(57) ABSTRACT

A liquid crystal display is disclosed. The liquid crystal display includes a first backlight source, a second backlight source and a liquid crystal panel. The first backlight source provides magenta backlight and the second backlight source provides green backlight. The first and second backlight sources are alternatively driven periodically to provide backlight for illustrating images. The liquid crystal panel comprises a liquid crystal layer and a color filter. The liquid crystal molecules of the liquid crystal layer are controlled for adjusting the transmittance of the backlight provided by the first and second backlight sources. The color filter includes red pixel areas, transparent pixel areas and blue pixel areas for performing color filtering operations on the backlight penetrating through the liquid crystal layer.

10 Claims, 8 Drawing Sheets

LIQUID CRYSTAL DISPLAY

BACKGROUND OF THE INVENTION

1. Field of the Invention

The present invention relates to a liquid crystal display, and more particularly, to a liquid crystal display with wide color gamut.

2. Description of the Prior Art

Because the liquid crystal display (LCD) has advantages of thin appearance, low power consumption, and low radiation, the liquid crystal display has been widely applied in various electronic products for panel displaying. In general, the liquid crystal display comprises a color filter, a liquid crystal layer and a backlight source. However, because of the restriction imposed by the optical features of the color filter and the liquid crystal layer, the liquid crystal display is unable to illustrate all true colors of an original image. In other words, how to develop a liquid crystal display having high color reproduction performance is one of the most important topics nowadays.

FIG. 1 is a schematic diagram showing a prior-art liquid crystal display. As shown in FIG. 1, the liquid crystal display 100 comprises a color filter 110, a liquid crystal layer 120, a thin film transistor array unit 130, a diffuser 140 and a backlight source 150. The color filter 110 comprises a plurality of red pixel areas 101, a plurality of green pixel areas 102 and a plurality of blue pixel areas 103 arranged periodically. The liquid crystal display 100 controls circuit operations of the thin film transistor array unit 130 for writing data signals to pixel units based on gate signals. The written data signals are then employed to vary voltage drops between opposite sides of different pixel areas of the liquid crystal layer 120 for twisting the angles of the liquid crystal molecules in the liquid crystal layer 120 so that the transmittances of different pixel areas of the liquid crystal layer 120 can be controlled for illustrating images with the aid of uniform backlight provided by the backlight source 150 in coordination with the diffuser 140.

By making use of the color filter 110 and the backlight source 150 both having a high color rendering property, the liquid crystal display 100 is able to achieve a color gamut over 100% of NTSC (National Television Standards Committee) color gamut. However, the color filter 110 having a high color rendering property has low transmittance, and therefore the output brightness of the liquid crystal display 100 is reduced significantly. For that reason, the backlight source 150 is required to provide backlight having much higher brightness for retaining image brightness, i.e. resulting in high backlight power consumption.

SUMMARY OF THE INVENTION

In accordance with an embodiment of the present invention, a liquid crystal display with wide color gamut is provided. The liquid crystal display comprises a first backlight source, a second backlight source and a liquid crystal panel. The first backlight source has a backlight spectrum essentially comprising a first brightness peak wavelength and a second brightness peak wavelength. The first brightness peak wavelength falls into a wavelength range between about 400 nm and about 480 nm. The second brightness peak wavelength falls into a wavelength range between about 600 nm and about 700 nm. The second backlight source has a backlight spectrum essentially comprising a third brightness peak wavelength. The third brightness peak wavelength falls into a wavelength range between about 500 nm and about 580 nm. The liquid crystal panel comprises a liquid crystal layer and a color filter. The liquid crystal layer has a plurality of liquid crystal molecules being controlled for adjusting a transmittance of backlight provided by the first backlight source and the second backlight source. The color filter functions to perform color filtering operations on the backlight penetrating through the liquid crystal layer.

In accordance with another embodiment of the present invention, a liquid crystal display with wide color gamut is provided. The liquid crystal display comprises a first backlight source, a second backlight source and a color filter. The first backlight source has a backlight spectrum essentially comprising a first brightness peak wavelength and a second brightness peak wavelength. The first brightness peak wavelength falls into a wavelength range between about 400 nm and about 480 nm. The second brightness peak wavelength falls into a wavelength range between about 600 nm and about 700 nm. The second backlight source has a backlight spectrum essentially comprising a third brightness peak wavelength. The third brightness peak wavelength falls into a wavelength range between about 500 nm and about 580 nm. The color filter has a plurality of pixel areas for performing color filtering operations on backlight provided by the first backlight source and the second backlight source. The plurality of pixel areas comprises at least one transparent pixel area.

These and other objectives of the present invention will no doubt become obvious to those of ordinary skill in the art after reading the following detailed description of the preferred embodiment that is illustrated in the various figures and drawings.

Table 1 shows result data of the color coordinates (x, y), based on the CIE 1931 chromaticity diagram, of the penetration lights corresponding to filtering operations of the color filter on backlights generated by the first embodiments of the first backlight source and the second backlight source.

Table 2 shows result data of the color coordinates (u', v'), based on the CIE 1976 chromaticity diagram, of the penetration lights corresponding to filtering operations of the color filter on backlights generated by the first embodiments of the first backlight source and the second backlight source.

DETAILED DESCRIPTION

Hereinafter, preferred embodiments of the present invention will be described in detail with reference to the accompanying drawings. Here, it is to be noted that the present invention is not limited thereto.

Figure 1:
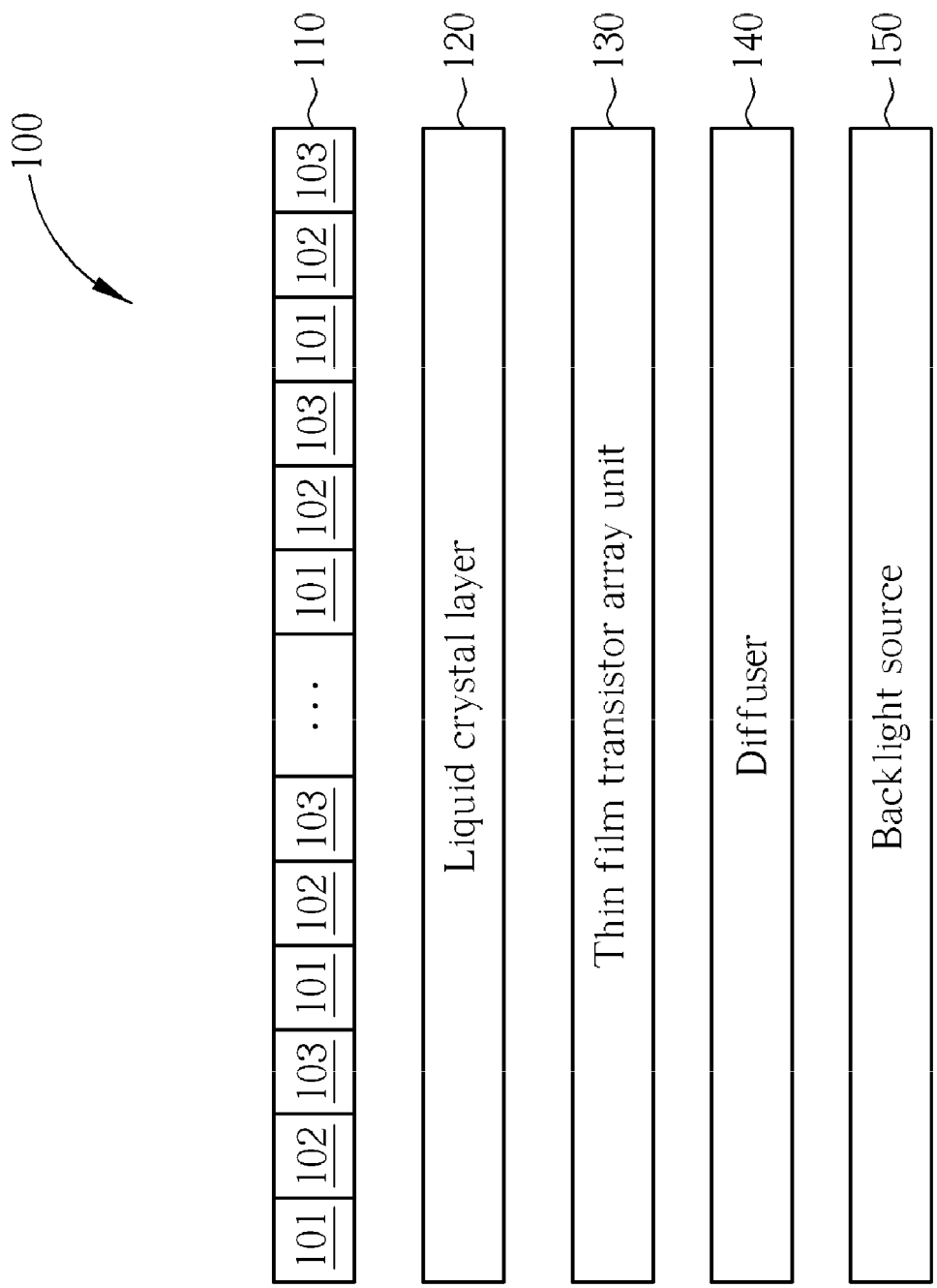
FIG. 1 is a schematic diagram showing a prior-art liquid crystal display.
Figure 2:
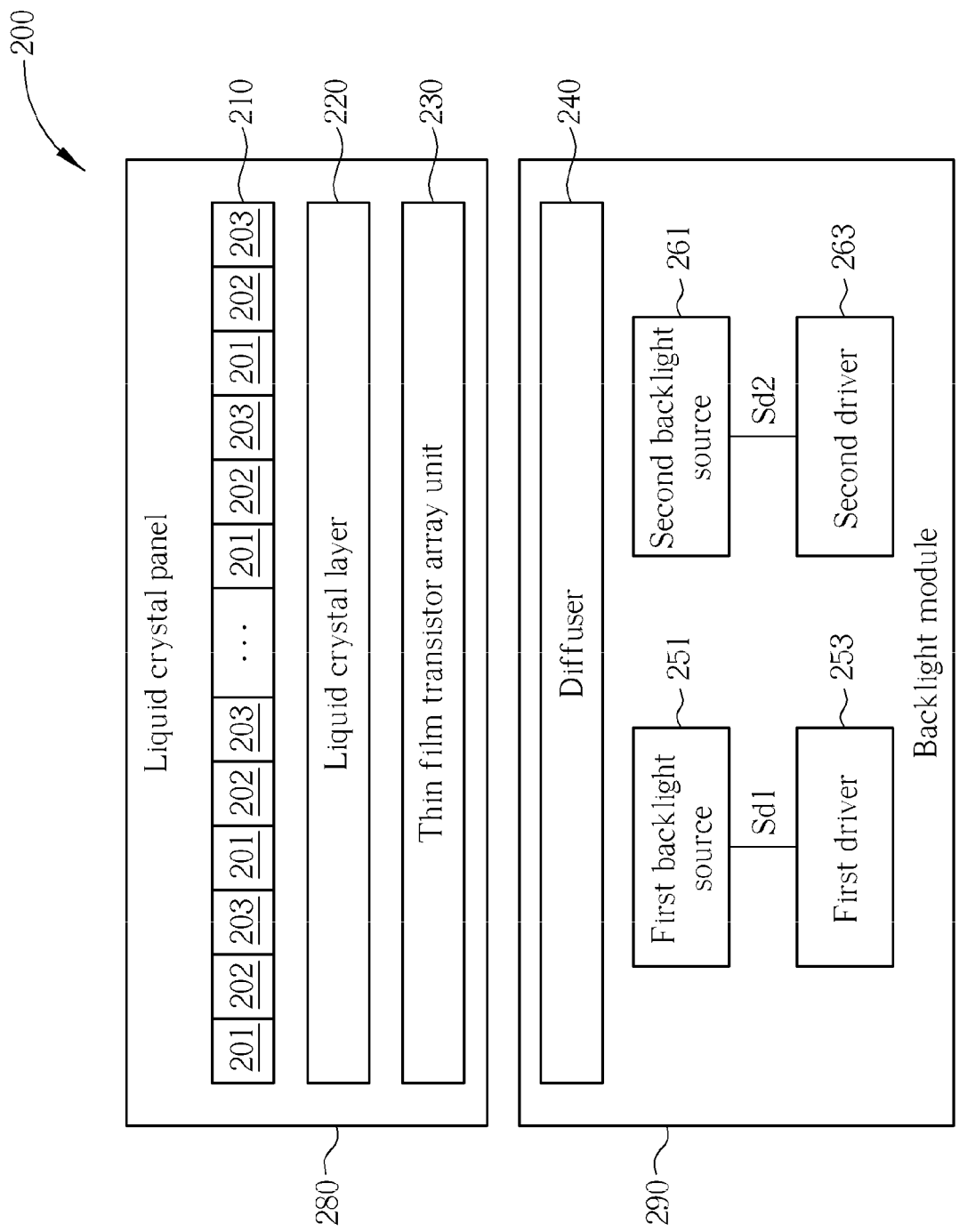
FIG. 2 is a schematic diagram showing a liquid crystal display in accordance with a preferred embodiment of the present invention.

FIG. 2 is a schematic diagram showing a liquid crystal display in accordance with a preferred embodiment of the present invention. As shown in FIG. 2, the liquid crystal display 200 comprises a liquid crystal panel 280 and a backlight module 290. The liquid crystal panel 280 comprises a color filter 210, a liquid crystal layer 220 and a thin film transistor array unit 230. The backlight module 290 comprises a diffuser 240, a first backlight source 251, a first driver 253, a second backlight source 261 and a second driver 263.

The liquid crystal display 200 controls circuit operations of the thin film transistor array unit 230 for writing data signals to pixel units based on gate signals. The written data signals are then employed to vary voltage drops between opposite sides of different pixel areas of the liquid crystal layer 220 for twisting the angles of the liquid crystal molecules in the liquid crystal layer 220 so that the transmittances of different pixel areas of the liquid crystal layer 220 can be controlled for illustrating images with the aid of uniform backlight provided by the first backlight source 251 and the second backlight source 261 in coordination with the diffuser 240. The first driver 253 is employed to provide a first driving signal Sd1 for driving the first backlight source 251. Also, the second driver 263 is employed to provide a second driving signal Sd2 for driving the second backlight source 261.

The color filter 210 comprises a plurality of red pixel areas 201, a plurality of transparent pixel areas 202 and a plurality of blue pixel areas 203 arranged periodically. In one embodiment, the red pixel areas 201, the transparent pixel areas 202 and the blue pixel areas 203 of two adjacent rows of the color filter 210 are sequentially arranged in same order. In another embodiment, the red pixel areas 201, the transparent pixel areas 202 and the blue pixel areas 203 of two adjacent rows of the color filter 210 are sequentially arranged in different orders.

The backlight spectrum of the first backlight source 251 mainly comprises a first brightness peak wavelength and a second brightness peak wavelength. The first brightness peak wavelength falls into a wavelength range between about 400 nm and about 480 nm. The second brightness peak wavelength falls into another wavelength range between about 600 nm and about 700 nm. That is, the first backlight source 251 is employed to provide magenta light. In a first embodiment of the first backlight source 251, the first backlight source 251 comprises a blue light emitting diode (LED) covered with a red phosphor powder layer. In a second embodiment of the first backlight source 251, the first backlight source 251 comprises a blue light source and a red light source. The blue light source is a blue LED or a blue organic light emitting diode (OLED). The red light source is a red LED or a red OLED. In a third embodiment of the first backlight source 251, the first backlight source 251 comprises a cold-cathode fluorescent lamp (CCFL) coated with both a blue phosphor powder layer and a red phosphor powder layer. In a fourth embodiment of the first backlight source 251, the first backlight source 251 comprises an external electrode fluorescent lamp (EEFL) coated with both a blue phosphor powder layer and a red phosphor powder layer.

The backlight spectrum of the second backlight source 261 mainly comprises a brightness peak wavelength falling into a wavelength range between about 500 nm and about 580 nm. That is, the second backlight source 261 is employed to provide green light. In a first embodiment of the second backlight source 261, the second backlight source 261 comprises a green LED. In a second embodiment of the second backlight source 261, the second backlight source 261 comprises a green OLED. In a third embodiment of the second backlight source 261, the second backlight source 261 comprises a CCFL coated with a green phosphor powder layer. In a fourth embodiment of the second backlight source 261, the second backlight source 261 comprises an EEFL coated with a green phosphor powder layer.

Figure 3:
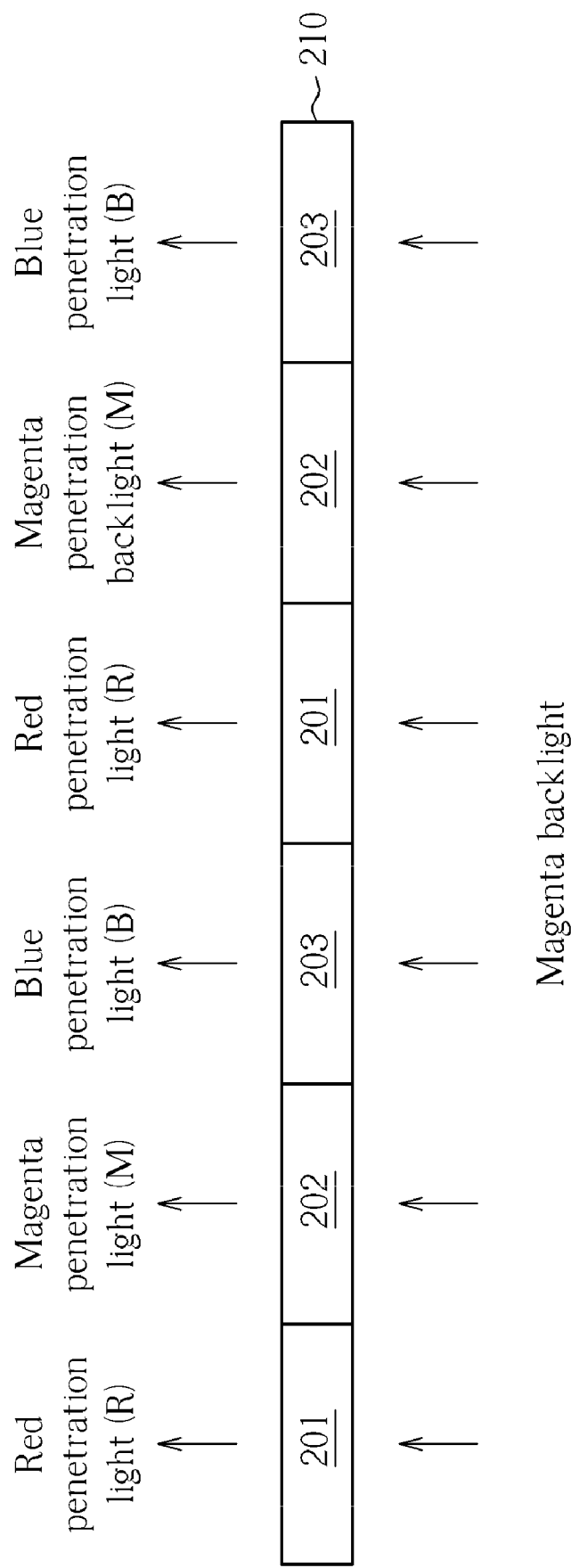
FIG. 3 is a diagram schematically showing filtering operations on magenta backlight by the color filter in FIG. 2.
Figure 4:
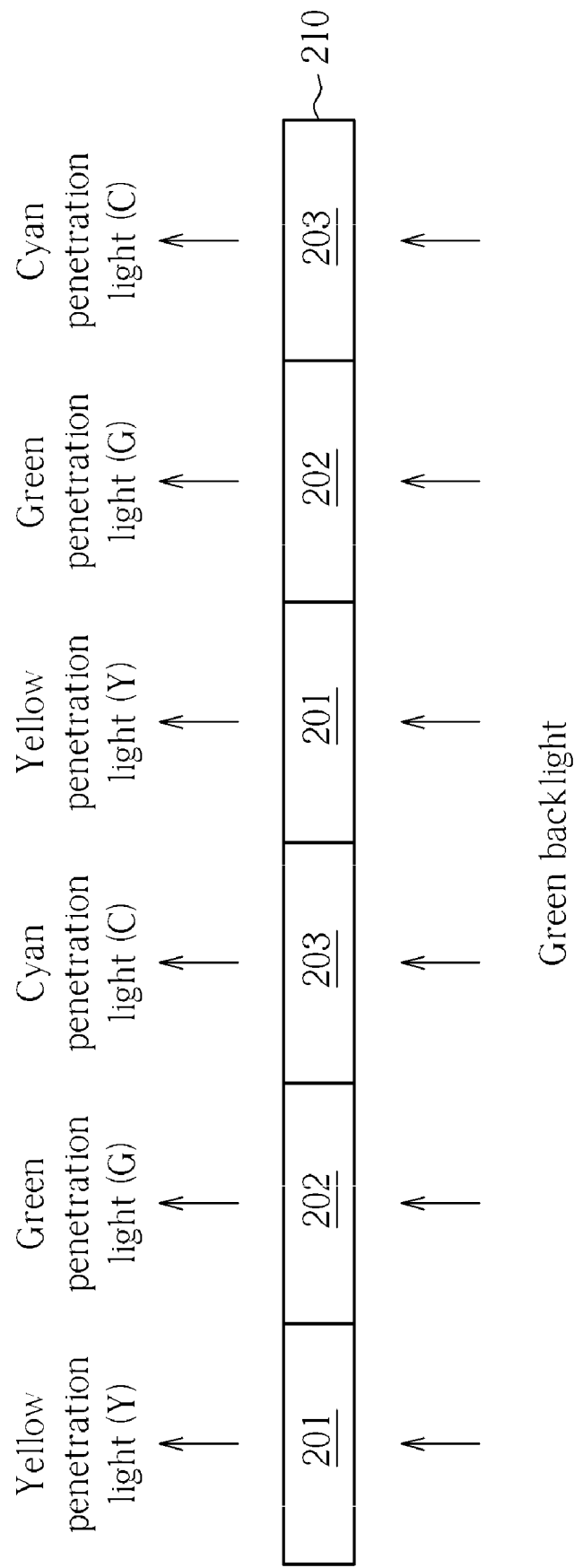
FIG. 4 is a diagram schematically showing filtering operations on green backlight by the color filter in FIG. 2.

FIG. 3 is a diagram schematically showing filtering operations on magenta backlight by the color filter 210 in FIG. 2. As shown in FIG. 3, the red pixel area 201 performs a filtering operation for converting magenta backlight into red penetration light (R). The transparent pixel area 202 performs a filtering operation on magenta backlight and outputs magenta penetration light (M). The blue pixel area 203 performs a filtering operation for converting magenta backlight into blue penetration light (B). FIG. 4 is a diagram schematically showing filtering operations on green backlight by the color filter 210 in FIG. 2. As shown in FIG. 4, the red pixel area 201 performs a filtering operation for converting green backlight into yellow penetration light (Y). The transparent pixel area 202 performs a filtering operation on green backlight and outputs green penetration light (G). The blue pixel area 203 performs a filtering operation for converting green backlight into cyan penetration light (C).

Figure 5:
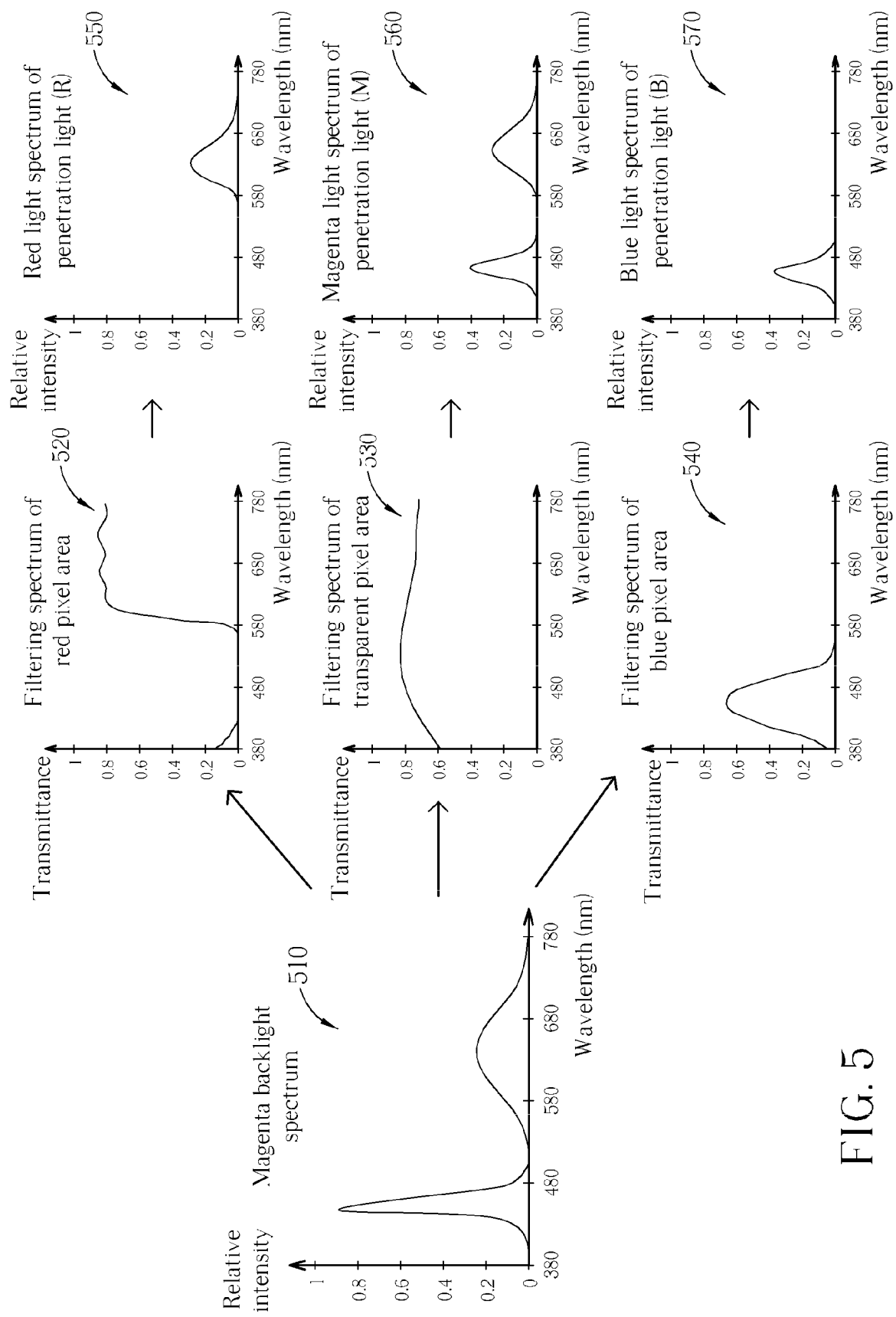
FIG. 5 is a schematic diagram illustrating related spectrums regarding filtering operations of the color filter on magenta backlight provided based on the first embodiment of the first backlight source.

FIG. 5 is a schematic diagram illustrating related spectrums regarding filtering operations of the color filter 210 on magenta backlight provided based on the first embodiment of the first backlight source 251. As shown in FIG. 5, the blue LED covered with the red phosphor powder layer provide backlight having a magenta backlight spectrum 510. Consistent with aforementioned magenta backlight, the magenta backlight spectrum 510 mainly comprises a first brightness peak wavelength between 400 nm and 480 nm and a second brightness peak wavelength between 600 nm and 700 nm. The filtering spectrum 520 of the red pixel area 201 indicates that backlight having wavelength greater than about 600 nm has high transmittance. The filtering spectrum 530 of the transparent pixel area 202 indicates that backlight of entire visible band, i.e. having wavelength between about 380 nm and about 780 nm, has high transmittance. The filtering spectrum 540 of the blue pixel area 203 indicates that backlight having wavelength between about 400 nm and about 480 nm has high transmittance.

Continue referring to FIG. 5, after the color filtering operation of the red pixel area 201, the magenta backlight provided by the first backlight source 251 is converted to become penetration light (R) having a red light spectrum 550. After the color filtering operation of the transparent pixel area 202, the magenta backlight provided by the first backlight source 251 is converted to become penetration light (M) having a magenta light spectrum 560 similar to the magenta backlight spectrum 510. After the color filtering operation of the blue pixel area 203, the magenta backlight provided by the first backlight source 251 is converted to become penetration light (B) having a blue light spectrum 570.

Figure 6:
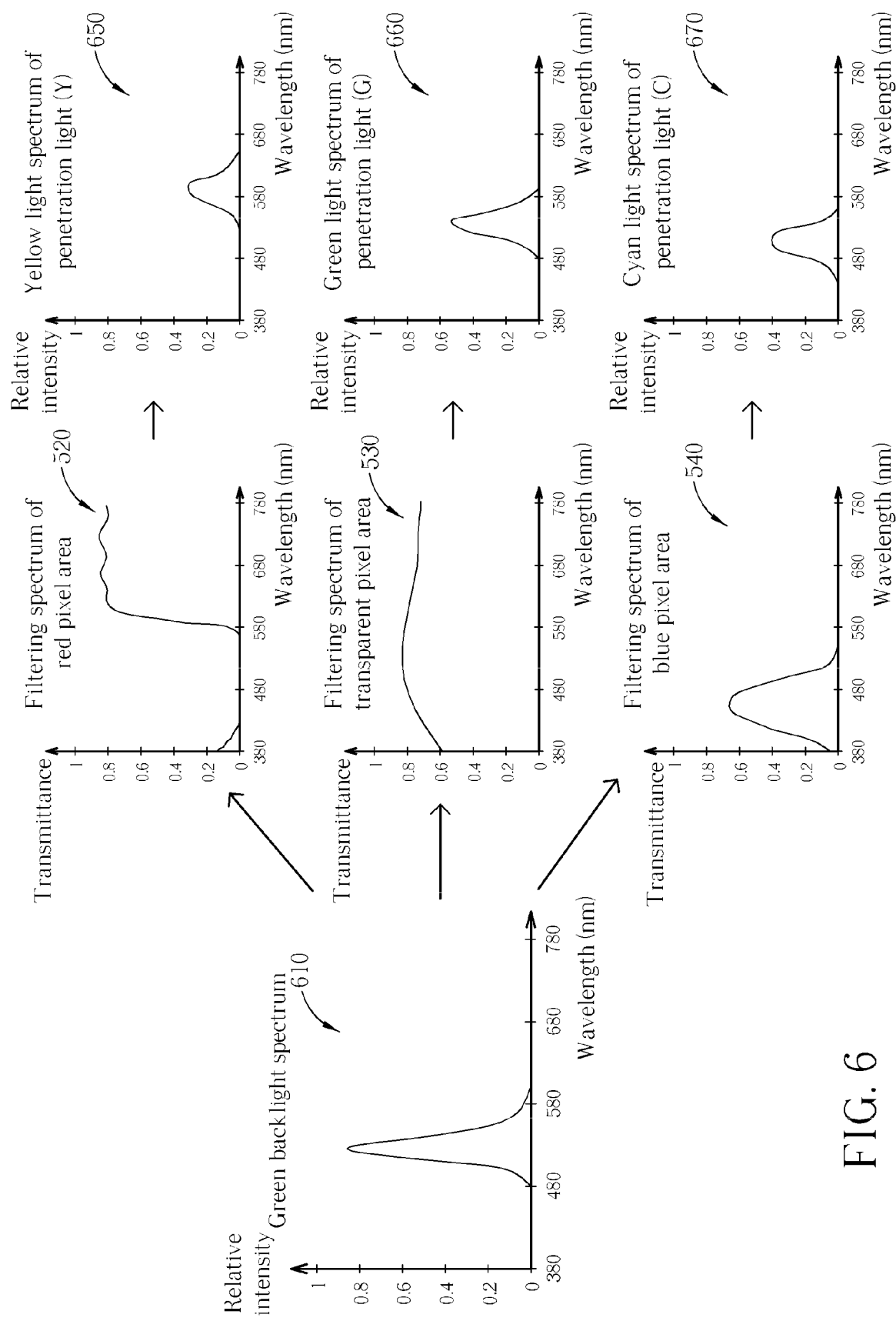
FIG. 6 is a schematic diagram illustrating related spectrums regarding filtering operations of the color filter on green backlight provided based on the first embodiment of the second backlight source.

FIG. 6 is a schematic diagram illustrating related spectrums regarding filtering operations of the color filter 210 on green backlight provided based on the first embodiment of the second backlight source 261. As shown in FIG. 6, the green LED provides green backlight having a green backlight spectrum 610. Consistent with aforementioned green backlight, the green backlight spectrum 610 mainly comprises a brightness peak wavelength between 500 nm and 580 nm. Similarly, after the color filtering operation of the red pixel area 201, the green backlight provided by the second backlight source 261 is converted to become penetration light (Y) having a yellow light spectrum 650. After the color filtering operation of the transparent pixel area 202, the green backlight provided by the second backlight source 261 is converted to become penetration light (G) having a green light spectrum 660 similar to the green backlight spectrum 610. After the color filtering operation of the blue pixel area 203, the green backlight provided by the second backlight source 261 is converted to become penetration light (C) having a cyan light spectrum 670.

Table 1 shows result data of the color coordinates (x, y), based on the CIE 1931 chromaticity diagram, of the penetration lights corresponding to filtering operations of the color filter 210 on backlights generated by the first embodiments of the first backlight source 251 and the second backlight source 261. As shown in Table 1, the color coordinates regarding the red light spectrum 550 are R(0.637, 0.322), the color coordinates regarding the yellow light spectrum 650 are Y(0.393, 0.570), the color coordinates regarding the green light spectrum 660 are G(0.185, 0.744), the color coordinates regarding the cyan light spectrum 670 are C(0.064, 0.711), and the color coordinates regarding the blue light spectrum 570 are B(0.149, 0.029).

Figure 7:
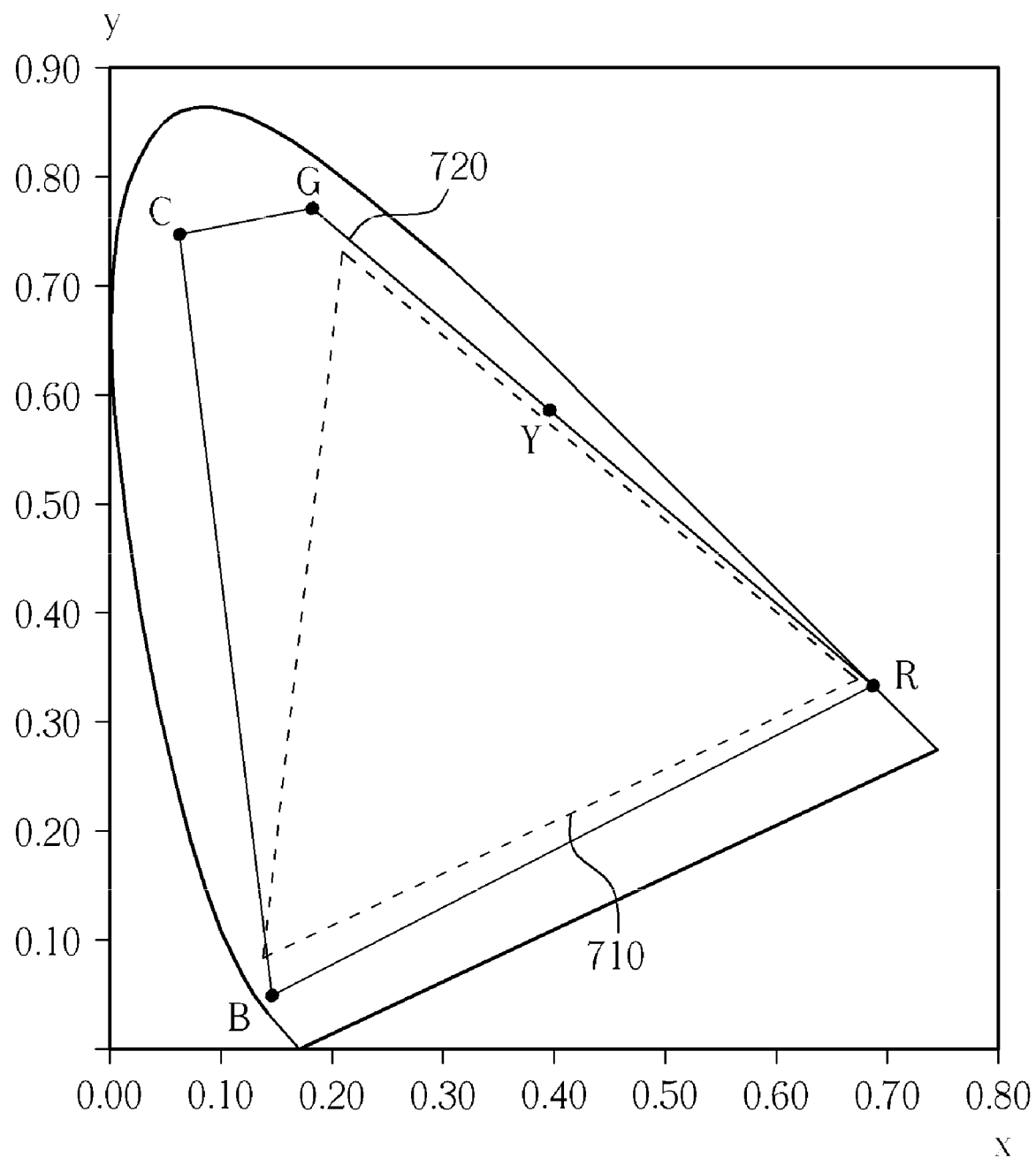
FIG. 7 illustrates the color gamut corresponding to the result data of Table 1 based on the CIE 1931 chromaticity diagram in accordance with the preferred embodiment of the present invention.

FIG. 7 illustrates the color gamut corresponding to the result data of Table 1 based on the CIE 1931 chromaticity diagram in accordance with the preferred embodiment of the present invention. Referring to FIG. 7, a color gamut 710 represents the NTSC color gamut created by the National Television Standards Committee. The color gamut 720 represents the color gamut corresponding to the color coordinates R, Y, G, C and B of Table 1. As shown in FIG. 7, the color gamut 720, corresponding to the preferred embodiment of the present invention, is about 140% of the NTSC color gamut 710.

Table 2 shows result data of the color coordinates (u', v'), based on the CIE 1976 chromaticity diagram, of the penetration lights corresponding to filtering operations of the color filter 210 on backlights generated by the first embodiments of the first backlight source 251 and the second backlight source 261. As shown in Table 2, the color coordinates regarding the red light spectrum 550 are R(0.473, 0.527), the color coordinates regarding the yellow light spectrum 650 are Y(0.174, 0.567), the color coordinates regarding the green light spectrum 660 are G(0.064, 0.579), the color coordinates regarding the cyan light spectrum 670 are C(0.023, 0.561), and the color coordinates regarding the blue light spectrum 570 are B(0.204, 0.076). Based on the CIE 1976 chromaticity diagram, the color gamut defined by the color coordinates R, Y, G, C and B of Table 2 corresponding to the preferred embodiment of the present invention, is about 150% of the corresponding NTSC color gamut.

Figure 8:
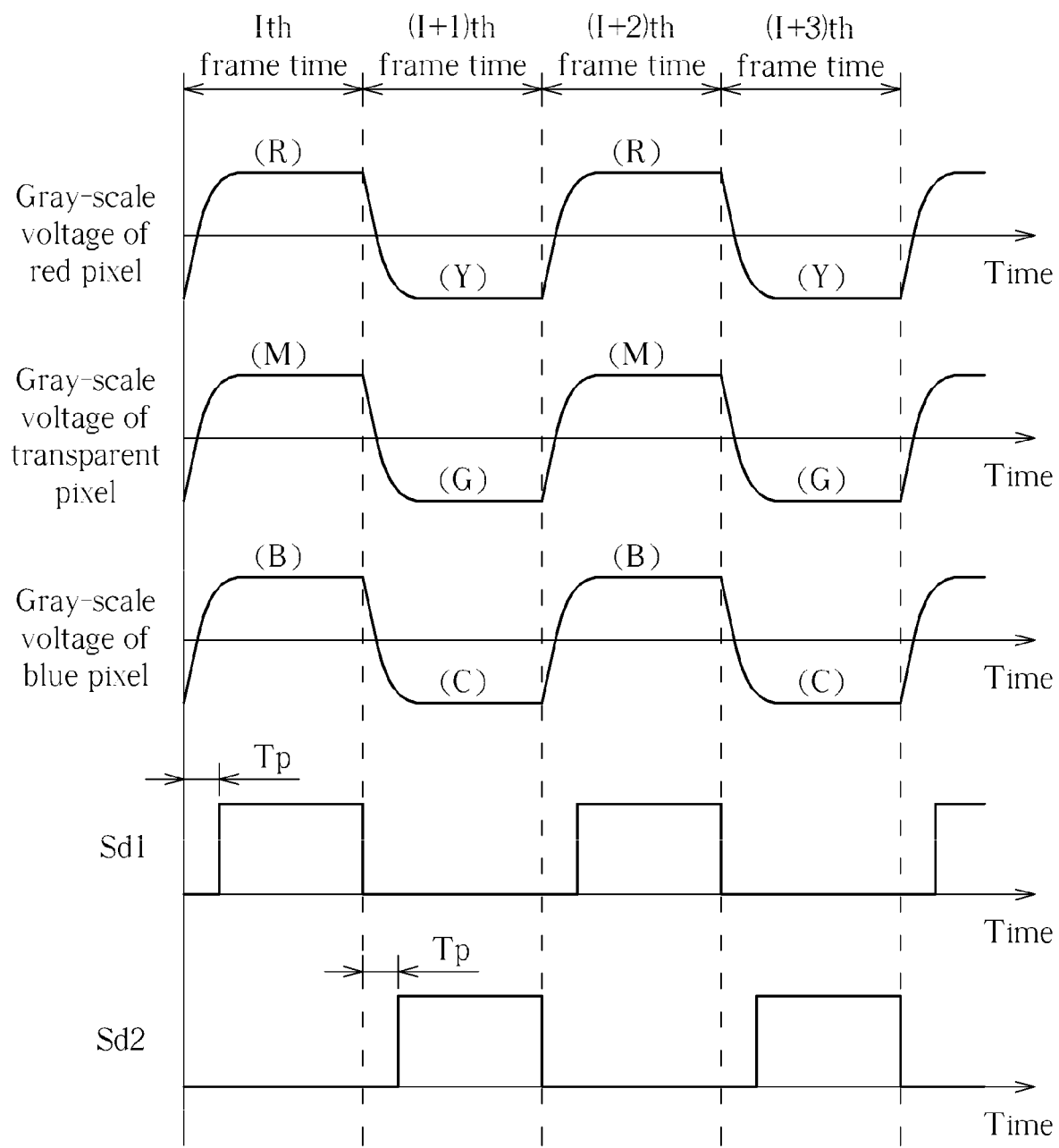
FIG. 8 is a schematic diagram showing signal waveforms corresponding to operations of the liquid crystal display in FIG. 2, having time along the abscissa.

FIG. 8 is a schematic diagram showing signal waveforms corresponding to operations of the liquid crystal display 200 in FIG. 2, having time along the abscissa. The signal waveforms in FIG. 8, from top to bottom, are the gray-scale voltage of red pixel, the gray-scale voltage of transparent pixel, the gray-scale voltage of blue pixel, the first driving signal Sd1 and the second driving signal Sd2. As shown in FIG. 8, during each frame time, the first driving signal Sd1 or the second driving signal Sd2 is enabled to drive the first backlight source 251 or the second backlight source 261 after delaying a preliminary time Tp for stabilizing the gray-scale voltages. Fundamentally, the first driver 253 and the second driver 263 are alternatively driving the first backlight source 251 and the second backlight source 261 periodically for alternatively providing magenta backlight and green backlight periodically.

For instance, during an Ith frame time, after the gray-scale voltage of red pixel, the gray-scale voltage of transparent pixel and the gray-scale voltage of the blue pixel reach stable state by delaying a preliminary time Tp, the first driver 253 outputs an enabled first driving signal Sd1 for driving the first backlight source 251 to provide magenta backlight; meanwhile, the magenta backlight is filtered by the red pixel area 201, the transparent pixel area 202 and the blue pixel area 203 for respectively outputting red penetration light (R), magenta penetration light (M) and blue penetration light (B). During a (I+1)th frame time, after the gray-scale voltage of red pixel, the gray-scale voltage of transparent pixel and the gray-scale voltage of the blue pixel reach stable state by delaying a preliminary time Tp, the second driver 263 outputs an enabled second driving signal Sd2 for driving the second backlight source 261 to provide green backlight; meanwhile, the green backlight is filtered by the red pixel area 201, the transparent pixel area 202 and the blue pixel area 203 for respectively outputting yellow penetration light (Y), green penetration light (G) and cyan penetration light (C). Thereafter, the aforementioned backlight driving operations during the Ith and (I+1)th frame times are repeated during a (I+2)th frame time and a (I+3)th frame time respectively. Accordingly, the red penetration light (R), the yellow penetration light (Y), the green penetration light (G), the cyan penetration light (C) and the blue penetration light (B) are able to achieve the color gamut shown in FIG. 7 in accordance with the preferred embodiment of the present invention.

In summary, by means of alternatively providing magenta backlight and green backlight periodically and making use of a color filter having red pixel areas, transparent pixel areas and blue pixel areas, the liquid crystal display of the present invention is able to illustrate image having wide color gamut. Furthermore, because the transparent pixel areas substantially cover one-third region of the color filter, and therefore the average transmittance of backlight through the color filter can be raised significantly. Compared with the aforementioned prior art, the liquid crystal display of the present invention is able to illustrate images having higher brightness based on same backlight intensity; or alternatively, the intensity of backlight provided by the backlight source of the present invention can be reduced for saving power consumption based on same image brightness.

The present invention is by no means limited to the embodiments as described above by referring to the accompanying drawings, which may be modified and altered in a variety of different ways without departing from the scope of the present invention. Thus, it should be understood by those skilled in the art that various modifications, combinations, sub-combinations and alternations might occur depending on design requirements and other factors insofar as they are within the scope of the appended claims or the equivalents thereof.

TABLE 1

| CIE1931 | x | y |
|---|---|---|
| R | 0.673 | 0.322 |
| Y | 0.393 | 0.570 |
| G | 0.185 | 0.744 |
| C | 0.064 | 0.711 |
| B | 0.149 | 0.029 |

TABLE 2

| CIE1976 | u' | v' |
|---|---|---|
| R | 0.473 | 0.527 |
| Y | 0.174 | 0.567 |
| G | 0.064 | 0.579 |
| C | 0.023 | 0.561 |
| B | 0.204 | 0.076 |

What is claimed is:

1. A liquid crystal display comprising:
   a first backlight source having a backlight spectrum comprising:
      a first brightness peak wavelength falling into a wavelength range between about 400 nm and about 480 nm; and
      a second brightness peak wavelength falling into a wavelength range between about 600 nm and about 700 nm;
   a second backlight source having a backlight spectrum comprising:
      a third brightness peak wavelength falling into a wavelength range between about 500 nm and about 580 nm;
   wherein the first backlight source and the second backlight source are coupled to be alternatively driven periodically; and
   a liquid crystal panel comprising:
      a liquid crystal layer having a plurality of liquid crystal molecules being controlled for adjusting a transmittance of backlight provided by the first backlight source and the second backlight source; and
      a color filter for performing color filtering operations on the backlight penetrating through the liquid crystal layer.

2. The liquid crystal display of claim 1, further comprising:
   a first driver for driving the first backlight source; and
   a second driver for driving the second backlight source.

3. The liquid crystal display of claim 2, wherein the first driver and the second driver are alternatively driving the first backlight source and the second backlight source periodically.

4. The liquid crystal display of claim 1, wherein the first backlight source comprises a blue light emitting diode (LED) covered with a red phosphor powder layer.

5. The liquid crystal display of claim 1, wherein the first backlight source comprises a blue lighting source and a red lighting source.

6. The liquid crystal display of claim 5, wherein the blue lighting source is a blue LED or a blue organic light emitting diode (OLED), and the red lighting source is a red LED or a red OLED.

7. The liquid crystal display of claim 1, wherein the first backlight source comprises a cold-cathode fluorescent lamp (CCFL) coated with a blue phosphor powder layer and a red phosphor powder layer.

8. The liquid crystal display of claim 1, wherein the first backlight source comprises an external electrode fluorescent lamp (EEFL) coated with a blue phosphor powder layer and a red phosphor powder layer.

9. The liquid crystal display of claim 1, wherein the second backlight source comprises a green lighting source.

10. The liquid crystal display of claim 9, wherein the green lighting source is a green LED or a green OLED.

* * * * *